(12) United States Patent
Fong

(10) Patent No.: US 7,402,962 B1
(45) Date of Patent: Jul. 22, 2008

(54) SYSTEM AND METHODS OF DRIVING AN ELECTROLUMINESCENT LAMP

(75) Inventor: Vincent Lok-Cheung Fong, Cupertino, CA (US)

(73) Assignee: PacificTech Microelectronics, Inc., Grand Cayman (KY)

( * ) Notice: Subject to any disclaimer, the term of this patent is extended or adjusted under 35 U.S.C. 154(b) by 16 days.

(21) Appl. No.: 11/698,766

(22) Filed: Jan. 26, 2007

(51) Int. Cl.
*H05B 37/02* (2006.01)

(52) U.S. Cl. .................. 315/299; 315/307; 315/360

(58) Field of Classification Search ............ 315/206 R, 315/224, 225, 226, 291, 299, 307, 360, 362; 345/76, 77
See application file for complete search history.

(56) References Cited

U.S. PATENT DOCUMENTS

| | | | | | |
|---|---|---|---|---|---|
| 3,708,717 | A | * | 1/1973 | Fleming | ............ 345/76 |
| 4,982,314 | A | * | 1/1991 | Miki | ............ 363/16 |
| 5,366,978 | A | * | 11/1994 | Furukawa et al. | ...... 514/263.36 |
| 5,436,283 | A | * | 7/1995 | Okada et al. | ............ 523/120 |
| 5,457,359 | A | * | 10/1995 | Meyer | ............ 315/194 |
| 6,011,382 | A | * | 1/2000 | Littlefield et al. | ............ 323/222 |
| 6,555,967 | B2 | | 4/2003 | Lynch et al. | ............ 315/169.3 |
| 7,081,720 | B2 | * | 7/2006 | Burau et al. | ............ 315/291 |
| 7,355,351 | B2 | * | 4/2008 | Kyrberg et al. | ............ 315/209 R |

* cited by examiner

*Primary Examiner*—Thuy Vinh Tran
(74) *Attorney, Agent, or Firm*—Chad R. Walsh; Fountainhead Law Group PC

(57) ABSTRACT

Embodiments of the present invention include systems and methods of driving an electroluminescent lamp. In one embodiment, the electroluminescent lamp is driven to a first threshold during a first time period and then driven to successive voltages between the threshold and a maximum voltage during successive time. This method of driving the lamp waveshapes the lamp voltage signal. In one example, the thresholds are set to minimize audible noise from the electroluminescent lamp due to the piezoelectric effect.

12 Claims, 5 Drawing Sheets

SYSTEM AND METHODS OF DRIVING AN ELECTROLUMINESCENT LAMP

BACKGROUND

The present invention relates to drivers, and in particular, to systems and methods of driving an electroluminescent lamp.

Electroluminescent lamps are known as very low efficiency lamps. For example, a good electroluminescent lamp will yield about three to five lm/W of input power while a good fluorescent lamp will yield about 50 to 80 lm/W. The advantage they offer over traditional lighting though is their ability to provide even illumination over a flat area. Because of this, they are the preferred lamp in relatively low-intensity situations where it is important to obtain even glow over an entire area. Example applications may include providing backlight for LCDs in pagers, cell phones, watches, and control systems. Additionally, some lamps such as LEDs may require the use of a light guide to achieve light uniformity. However, this may increase the form factor. Many applications of EL lamps do not require a light guide, which makes them a good choice for applications requiring a thin form factor.

Since many of the applications for electroluminescent lamps are portable, circuits driving the lamp typically take a DC source, such as a battery, and transform the voltage into an AC signal at approximately 100V and 100 Hz. The brightness of the electroluminescent lamp is proportional to the applied voltage so it is desirable to reach the voltage required for normal operation as quickly as possible. FIG. 1 illustrates typical signal driving an electroluminescent lamp. The output voltage is received by an electroluminescent lamp from a driver circuit, such as an H-bridge type driver. In the first half-cycle, the output voltage transitions to the maximum voltage for normal operation and held there until the end of the half-cycle. Similarly, the output voltage transitions to the minimum voltage for normal operation and held there until the end of the half cycle. One problem that surfaces when driving an electroluminescent lamp in this manner is the occurrence of audible noise. The rapid change in high voltage may cause the thin sheets of material used in the creation of electroluminescent lamps to change shape and create an audible noise. This is known as the piezoelectric effect. If the voltage is raised too quickly, an audible noise may be generated by the lamp due to the piezoelectric effect. Conversely, if the voltage is raised too slowly in an attempt to avoid the piezoelectric effect, the lamp may not be able to maintain the level of illumination.

Thus, there is a need for an improved system and method of driving an electroluminescent lamp. The present invention solves these and other problems by providing a system and method of noise reduction for electroluminescent lamp drivers.

SUMMARY

Embodiments of the present invention include systems and methods of driving an electroluminescent lamp. In one embodiment, the present invention includes an electronic circuit comprising an electroluminescent lamp having a first terminal and a second terminal. A switching regulator having a first input coupled to an input voltage, an output for providing an output voltage, and a feedback input may be used for providing voltage to the lamp. A programmable feedback circuit having a first input coupled to the output of the regulator, an output coupled to the feedback input of the regulator to provide a feedback voltage, and a control input for programming a relationship between the regulator output voltage and the feedback voltage may be used to change the voltage supplied to the lamp. A driver circuit having a first control input, a first output coupled to the first terminal of the lamp, and a second output coupled to the second terminal of the lamp may be used to alternately apply the voltage from the regulator to the first and second terminals of the lamp during each cycle. During a first time period, the feedback circuit is programmed to increase a voltage across said electroluminescent lamp to a first threshold and then hold the voltage across said electroluminescent lamp constant. During one or more successive time periods, the feedback circuit is reprogrammed to successively increase the voltage across said electroluminescent lamp and then hold the voltage across said electroluminescent lamp constant. During a final time period, the feedback circuit is reprogrammed to increase a voltage across said electroluminescent lamp to a maximum voltage and then hold the voltage across said electroluminescent lamp constant.

In one embodiment, the regulator is a switching regulator.

In one embodiment, the regulator is a boost regulator. The regulator input may be coupled to a battery, for example.

In one embodiment, the programmable feedback circuit comprises a programmable resistor divider.

In one embodiment, the driver circuit is an H-Bridge driver.

In one embodiment, the electronic circuit further comprises a clock for generating a clock signal, a first divider coupled to the clock, wherein the first divider divides the clock signal by a first value to produce a first divided clock signal, a state machine (e.g., digital logic, programmable logic, or a processor) coupled between the first divided clock signal and the programmable feedback circuit, the state machine reprogramming the programmable feedback circuit in response to receiving the first divided clock signal, and a second divider coupled to receive the first divided clock signal, wherein the second divider divides the first divided clock signal by a second value to produce a second divided clock signal, wherein the driver circuit alternately couples first and second terminals of said electroluminescent lamp to the output of the switching regulator using the second divided clock signal.

In another embodiment, the present invention includes a method of driving an electroluminescent lamp comprising, during a first time period, increasing a voltage across said electroluminescent lamp to a first threshold and then holding the voltage across said electroluminescent lamp constant, during one or more successive time periods, successively increasing the voltage across said electroluminescent lamp and then holding the voltage across said electroluminescent lamp constant, and during a final time period, increasing a voltage across said electroluminescent lamp to a maximum voltage and then holding the voltage across said electroluminescent lamp constant.

In one embodiment, the present invention further comprises reprogramming the feedback of a regulator coupled to the lamp.

In one embodiment, the present invention further comprises reprogramming the feedback of a regulator coupled to the lamp at first frequency and alternating the voltage across said electroluminescent lamp at a second frequency, wherein the second frequency is a multiple of the first frequency.

In one embodiment, the present invention further comprises generating the voltage across the electroluminescent lamp using a switching regulator.

In one embodiment, the present invention further comprises coupling the input of the switching regulator to a battery, wherein the switching regulator is a boost regulator.

In one embodiment, the present invention further comprises generating a first clock signal at a first frequency, dividing the clock signal by a first value to produce a first divided clock signal, reprogramming a programmable resistor divider coupled between an output of a switching regulator and a feedback input of the switching regulator using the first divided clock signal, dividing the first divided clock signal by a second value to produce a second divided clock signal, and alternately coupling first and second terminals of said electroluminescent lamp to the output of the switching regulator using the second divided clock signal.

Additional embodiments will be evident from the following detailed description and accompanying drawings, which provide a better understanding of the nature and advantages of the present invention.

DETAILED DESCRIPTION

Described herein are systems and methods for driving an electroluminescent lamp. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
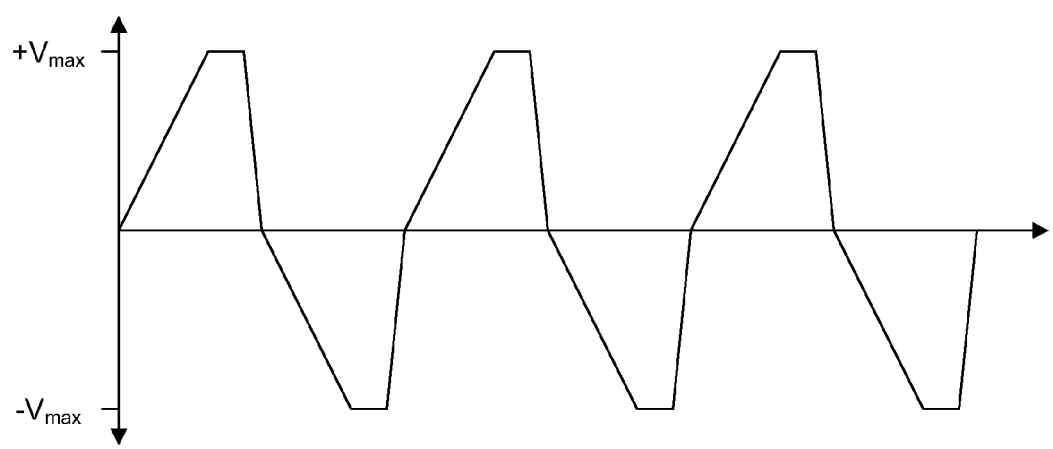
FIG. 1 illustrates typical signal driving an electroluminescent lamp.
Figure 2:
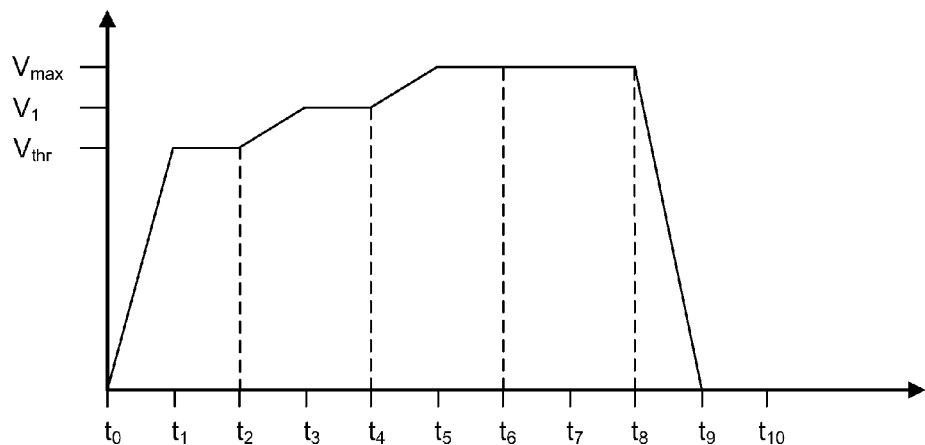
FIG. 2 illustrates a method of driving an electroluminescent lamp according to one embodiment of the present invention.

FIG. 2 illustrates a method of driving an electroluminescent lamp according to one embodiment of the present invention. The waveform in FIG. 2 illustrates one half-cycle of the driving signal wherein the half-cycle has been broken up into fifths by dotted lines. These fifths have been illustrated in FIG. 2 as $t_2$, $t_4$, $t_6$, $t_8$, and $t_{10}$, respectively. In the first fifth of the half-cycle, the driving signal is driven to threshold voltage $V_{thr}$. This occurs at time $t_1$. The determination of the threshold voltage may depend on many factors including the physical characteristics or limitations of the driver and the lamp. In one embodiment, the threshold voltage is set to a value where the voltage may be driven at a very high slew rate up to that value without creating any ill effects in the lamp. In one embodiment, the threshold voltage depends on minimizing the audible noise created by the electroluminescent lamp due to the piezoelectric effect.

After reaching threshold voltage $V_{thr}$ at time $t_1$, the signal may remain at that voltage until the first fifth of the half-cycle ends at $t_2$. This plateau region located between $t_1$ and $t_2$ may allow the energy stored within the thin sheets of the electroluminescent lamp to expand. This expansion may minimize the likelihood of the lamp creating audible noise due to the piezoelectric effect when the driving voltage of the lamp is increased. At the beginning of the second fifth of the half cycle between $t_2$ and $t_3$, the driving signal voltage is increased to $V_1$. Similar to voltage $V_{thr}$, the value of voltage $V_1$ may be based on a variety of factors including the characteristics and limitations of the driver and the lamp. In one embodiment, voltage $V_1$ is dependent on generating a slew rate below a certain threshold to minimize audible noise. In another embodiment, voltage $V_1$ is dependent on the maximum voltage, the threshold voltage, and the number of voltage levels to be used. The driving signal remains constant in the region between $t_3$ and $t_4$ until the end of the second fifth of the half-cycle due to the same reasons as described above for the region between $t_1$ and $t_2$. At the beginning of the third fifth of the half-cycle between $t_4$ and $t_5$, the driving signal voltage is increased to $V_{max}$, the voltage required for normal operation. Once the normal operating voltage is reached, the driving signal will remain at that voltage until the last portion of the clock cycle. This is shown by the region between $t_5$ and $t_8$. At time $t_8$, the voltage begins to decline back down to zero, which occurs at $t_9$. From there, the signal is held constant until the end of the last fifth of the clock cycle, $t_{10}$.

As can be seen in FIG. 2, the method of increasing to a first voltage, holding the signal constant, and then increasing to a second voltage has many benefits. In one instance, it allows the driver to raise the voltage quickly without generating enormous amounts of audible noise from the electroluminescent lamp. In another instance, it allows the lamp ample time to disperse stored up energy due to increases in voltage.

Figure 3:
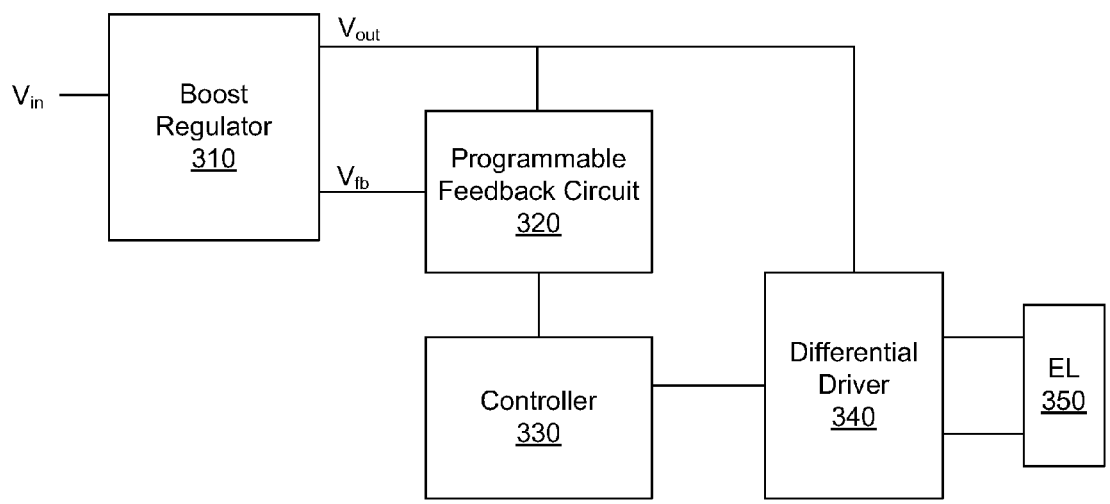
FIG. 3 illustrates an electronic circuit including a system to drive an electroluminescent lamp according to one embodiment of the present invention.

FIG. 3 illustrates an electronic circuit including a system to drive an electroluminescent lamp according to one embodiment of the present invention. Electronic circuit 300 may be implemented using discrete components or as a fully integrated circuit. Circuit 300 includes regulator 310, which in this example is a boost regulator, having one input to receive an input voltage ($V_{in}$), one input to receive a feedback voltage ($V_{fb}$), and one output to transmit an output voltage ($V_{out}$). Boost regulators may be beneficial for applications where the lamp is powered from a battery, such as a lithium ion battery, for example. The regulator may generate the output voltage based on the input voltage and the feedback voltage. In one embodiment, the feedback voltage is compared against a reference voltage within the boost regulator to determine whether the output voltage should increase or decrease. This reference voltage may be predefined or programmable. In one example, the reference voltage used for comparison with the feedback voltage is set to 1.2V. In one embodiment, the output voltage decreases if the feedback voltage is higher than the target feedback voltage. In another embodiment, the output voltage increases if the feedback voltage is lower than the reference voltage.

The output voltage of boost regulator 310 is coupled to programmable feedback circuit 320. Programmable feedback circuit 320 receives the output voltage from regulator 310 and generates a feedback voltage to regulator 310. The output voltage of regulator 310 may be coupled through driver 340 to control the voltage on the lamp (i.e., the target voltage) during each half-cycle. In one embodiment, the feedback voltage generated by circuit 320 depends on the target output voltage of the system.

Programmable feedback circuit 320 is also coupled to an output of controller 330. Controller 330 may transmit a control signal to set the target output voltage within circuit 320. In one embodiment, the target output voltage is set in circuit 320 by transmitting a value to circuit 320. In another embodiment, the control signal is set by using a state machine. A change in the target output voltage may be implemented by changing the feedback voltage sent to boost regulator 310 from programmable feedback circuit 320. This in turn will change the output voltage of boost regulator 310. Therefore, the control signal transmitted from controller 330 to circuit 320 may be used to control the output voltage of regulator 310 and the voltage on the lamp. Controller 330 is also coupled to the input of differential driver 340. Controller 330 sends a signal to driver 340 to control the switching frequency of the driver. For example, during a first half-cycle, controller 330 may configure the driver 340 to couple the output of regulator 310 to a first terminal of the lamp and couple a second terminal of the lamp to ground. During the next half-cycle, controller 330 may configure the driver 340 to couple the output of regulator 310 to the second terminal of the lamp and ground the first terminal. In one example, the control signal sent from controller 330 to driver 340 is at 100 hertz. In one embodiment, controller 330 sends a first control signal at a first frequency to driver 340 and a second control signal at a second frequency to circuit 320. While the frequency sent to driver 340 controls the switching frequency of the driving signal sent to lamp 350, the frequency sent to circuit 320 controls the shape of the driving signal sent to lamp 350. For instance, controller 330 may reprogram the feedback circuit 320 multiple times during each half-cycle so that the regulator output changes between Vthr to Vmax incrementally as shown in FIG. 2. In one example, controller 330 sends a control signal to circuit 320 that is eight times faster than the control signal sent to the driver 340. This would allow the shape of the driving signal to change eight times per half-cycle, or 16 times per cycle. Differential driver 340 is coupled to the output voltage of boost regulator 310 and the control signal of controller 330. The differential driver 340 may use these two inputs to drive electroluminescent lamp 350. For example, during a time period when controller 330 programs driver 340 into a particular state, controller 330 may reprogram circuit 320 to change the output voltage of regulator 310 across a plurality of voltage levels as illustrated in FIG. 2. When controller 330 reprograms driver 340 into a new state (e.g., a new half cycle of the lamp), controller 330 again reprograms circuit 320 to change the output voltage of regulator 310 across a plurality of voltage levels. Accordingly, by reprogramming the feedback circuit 320 at a higher frequency than the rate at which the driver is reconfigured, the voltage applied to the lamp on each half cycle may be shaped to reduce audible noise.

Figure 4:
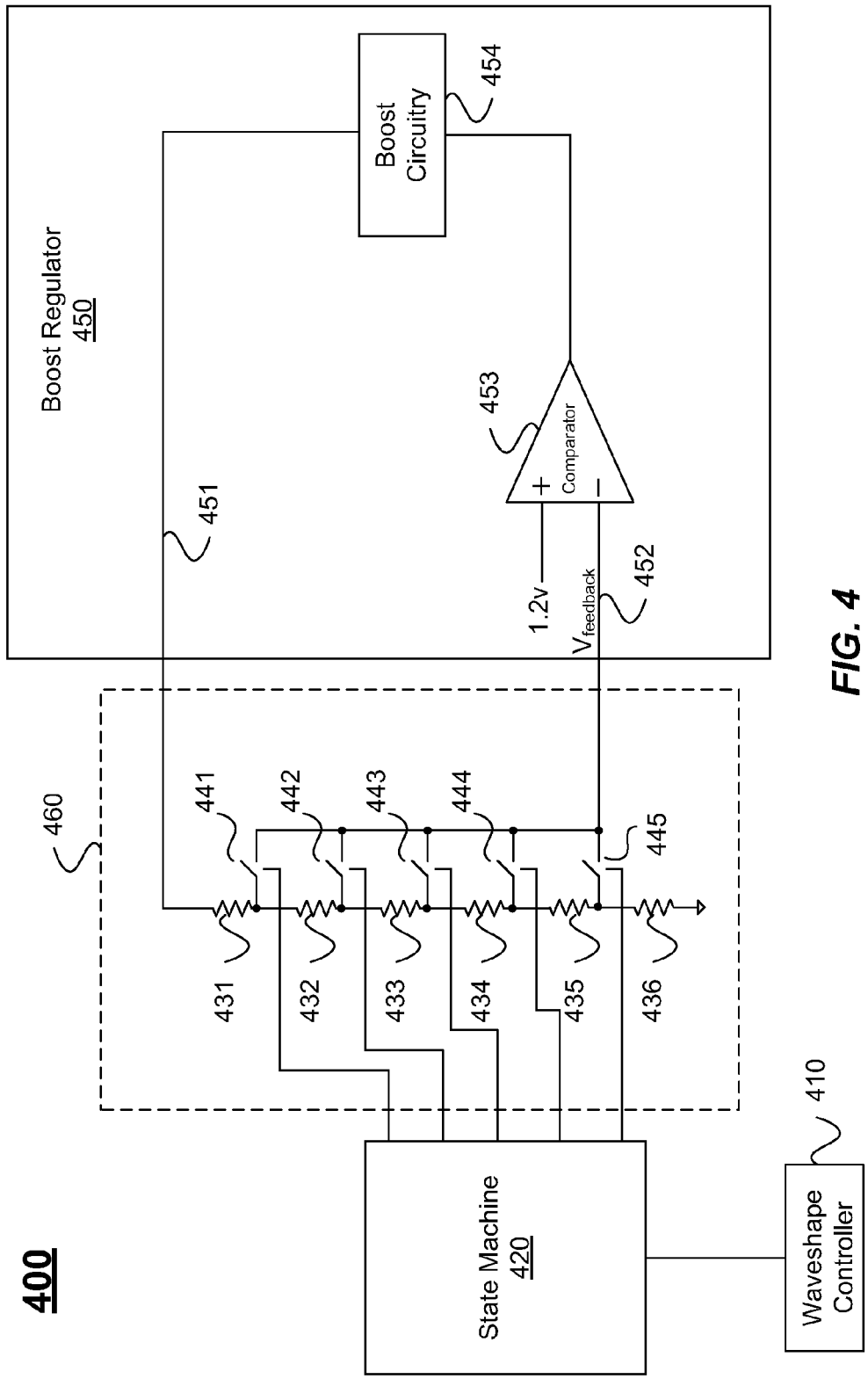
FIG. 4 illustrates an electronic circuit including a voltage control system to drive an electroluminescent lamp according to one embodiment of the present invention.

FIG. 4 illustrates an electronic circuit including a voltage control system to drive an electroluminescent lamp according to one embodiment of the present invention. In circuit 400, output voltage 451 may be modified by activating a switch from plurality of switches 441 through 445. Depending on the switch activated, the plurality of resistors 431 through 436, which form a voltage divider circuit, provide different outputs. Feedback voltage 452 is dependent on the selected voltage divider output. When a voltage divider circuit is coupled through a different switch, a change in the feedback voltage may occur. The voltage control system may then adjust output voltage 451 based on the feedback voltage output selected. Circuit 400 includes state machine 420 that is coupled to waveshape controller 410 and plurality of switches 441 through 445. State machine 420 may activate a switch from the plurality of switches 441 through 445 depending on the control signal received from controller 410. In one embodiment, state machine 420 may iterate through a series of states triggered by the edge of the signal received from controller 410. In one example, the iteration is based on the rising edge of the control signal received from controller 410. The plurality of switches 441 through 445 are coupled to the plurality of resistors 431 through 436. Together, the plurality of resistors and the plurality of switches form programmable voltage divider 460. The programmable voltage divider may enable state machine 420 to change the portion of the output voltage that is received by boost regulator 450 as feedback voltage. For example, if switch 444 is activated by state machine 420, a voltage divider is created where the first resistive load is the combination of resistors 431 through 434 and the second resistive load is the combination of resistors 435 and 436. Similarly, if switch 441 is activated by state machine 420, a voltage divider is created where the first resistive load is resistor 431 and the second resistive load is the combination of resistors 432 through 436.

The feedback voltage 452 is received by comparator 453 from variable voltage divider 460. Comparator 453 performs a comparison function between the feedback voltage and a reference voltage. The comparator then outputs a value based on the result of the comparison function. In one example, the reference voltage is 1.2 volts. In one embodiment, the comparator outputs a digital "one" when the feedback voltage is smaller than the constant voltage. In another embodiment, the comparator outputs a digital "zero" when the feedback voltage is smaller than the constant voltage. Comparator 453 is coupled to boost circuitry 454. Boost circuitry 454 may raise or lower output voltage 451 depending on the value received from comparator 453. Output voltage 451 is coupled from boost regulator 450 to programmable voltage divider 460. The programmable voltage divider 460 in combination with boost regulator 450 creates a system where the output voltage may be adjusted by state machine 420, which may be controlled by waveshape controller 410. Waveshape controller 410 changes the voltage provided to the lamp by reprogramming divider 460 through a plurality of states that change the voltage supplied to the lamp during each half-cycle. It is to be understood that a variety of waveshaping algorithms could be used to change the output voltage supplied to the lamp during each half-cycle to reduce noise, including the waveform illustrated in FIG. 2.

Figure 5:
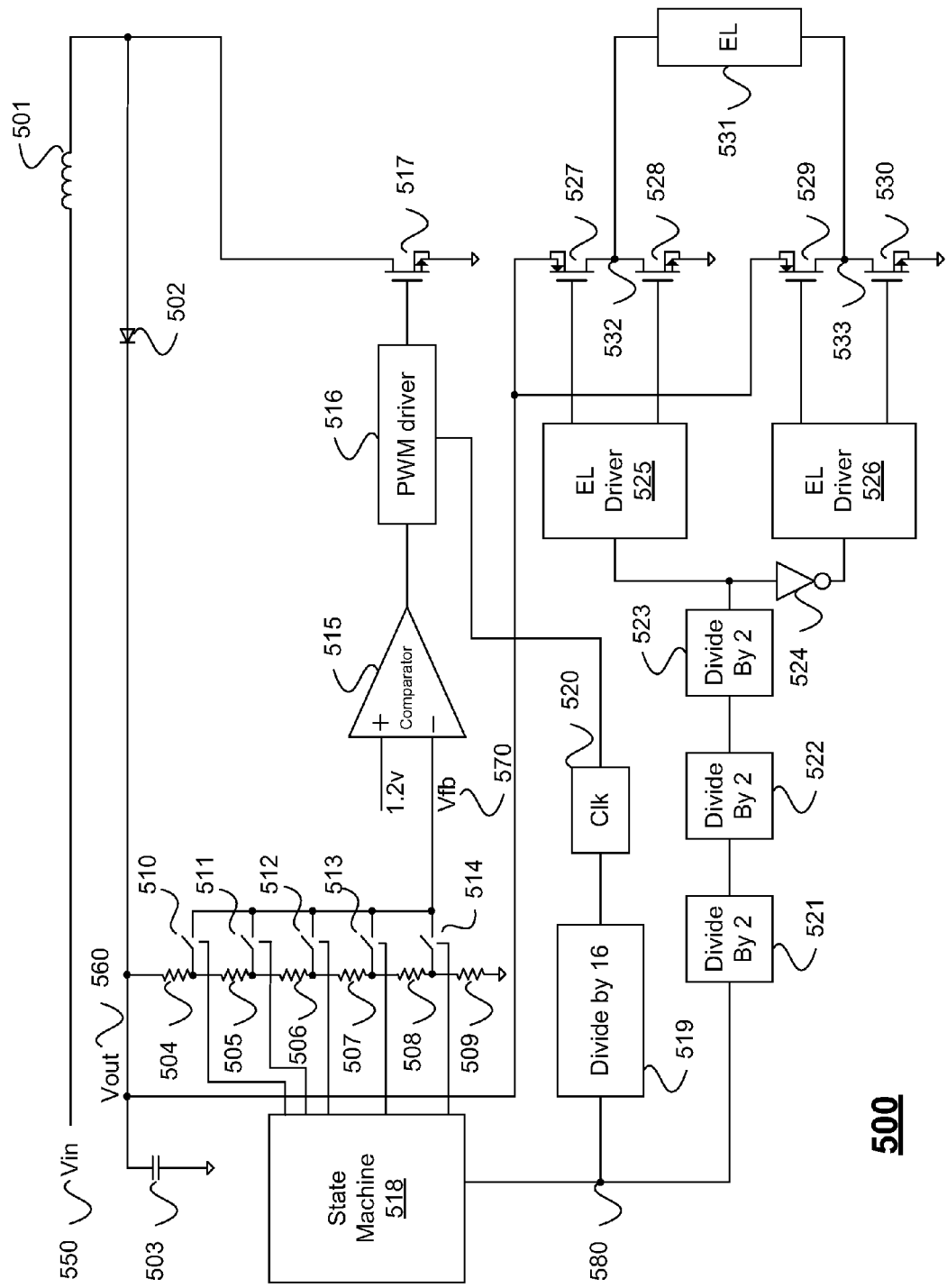
FIG. 5 is an example of an electronic circuit including a system to drive an electroluminescent lamp according to one embodiment of the present invention.

FIG. 5 is an example of an electronic circuit including a system to drive an electroluminescent lamp according to one embodiment of the present invention. Circuit 500 includes inductor 501, diode 502, capacitor 503, resistors 504 through 509, switches 510 through 514, comparator 515, pulse width modulator driver 516, transistor 517, state machine 518, "divide by 16" divider 519, clock 520, "divide by two" dividers 521 through 523, diode 524, electroluminescent drivers 525 and 526, transistors 527 through 530, and electroluminescent lamp 531. Input voltage 550 is coupled to output voltage 560 through a switching boost regulator comprising inductor 501, diode 502, capacitor 503, and transistor 517. For example, the input may be coupled to a battery, such as a lithium ion battery, which may have a low voltage insufficient for driving the lamp. The input voltage 550 may be boosted to an output voltage 560 sufficient to drive the lamp. The output voltage of the system may be controlled by adjusting the switching frequency of transistor 517.

Output voltage 560 is coupled to the control of transistor 517 through a programmable feedback circuit comprising a plurality of resistors 504 to 509 and switches 510-514, comparator 515, and PWM driver 516. Comparator 515 receives feedback voltage 570 from plurality of resistors 504 through 509. The comparator output may be based on a comparison function between value the feedback voltage and a reference voltage. In one embodiment, the comparator outputs a digital "one" to the PWM driver when the feedback voltage is larger than the reference voltage. In one example, the comparator has a preset value of 1.2 v. PWM driver 516 generates a switching signal that is coupled to the gate of transistor 517 based on the input received from comparator 515. In one embodiment, the PWM driver generates the signal when it receives a "one" from the comparator and grounds the gate of transistor 517 when it receives a "zero". A switching signal will cause transistor 517 to turn on and off, thereby generating a switching current in inductor 501. A current in inductor 501 will be coupled through diode 502 and into capacitor 503, which translates into a higher output voltage. As the output voltage approaches the desired output voltage, the difference between the feedback voltage and the reference voltage is reduced. As mentioned above, the desired voltage is set by programming the feedback circuit. When the output voltage increases above the desired voltage (e.g., a particular voltage level of a plurality of voltage levels in FIG. 2), the comparator output goes to zero and the PWM grounds the gate of transistor 517, and the current in inductor 501 and the output voltage 560 is thereby reduced.

Plurality of resistors 504 to 509 are coupled to state machine 518 through a plurality of switches 510 to 514. State machine 518 may adjust output voltage 560 by activating a switch from the plurality of switches 510 through 514. Depending on the switch activated, the resistive loads of the voltage divider may change. In one example, the activated switch creates a voltage divider wherein the output voltage is 50 times the feedback voltage. If the preset voltage in the comparator is 1.2 v, the output voltage may approach 60 v. In one example, the output voltage ranges from 60 v to 100 v depending on the activated switch. Clock 520 is coupled to the PWM driver. The PWM driver may use the clock waveform to create the switching sequence for transistor 517. The clock is also coupled to the state machine through "divide by 16" divider 519. The signal at node 580 may be used as a clock by the state machine to determine when to iterate to the next state, thereby changing the output voltage. The signal at node 580 is also coupled to electroluminescent driver 525 and electroluminescent driver 526 through a series of "divide by 2" dividers 521 to 523 and inverter 524. The series of "divide by 2" dividers form a "divide by 8" divider. This allows for up to eight changes in state machine 518 per clock cycle of driver 525 and driver 526. The half-cycles of the EL lamp are set by the divided clock signal at the input of each EL driver 525 and 526. Accordingly, during a first half-cycle, driver 525 may turn transistor 527 ON and turn transistor 528 OFF. Similarly, during the first half-cycle driver 526 may turn transistor 529 OFF and turn transistor 530 ON. Likewise, during a second half-cycle, driver 525 may turn transistor 527 OFF and turn transistor 528 ON, and driver 526 may turn transistor 529 ON and turn transistor 530 OFF. Inverter 524 is coupled to driver 526 so that driver 526 is 180 degrees out of phase from driver 525.

The final output stage in this example includes four transistors. A first transistor 527 has a first terminal coupled to a first reference source such as output voltage 560, a second terminal coupled to a first terminal of electroluminescent lamp 531 through node 532, and a control terminal coupled to driver 525. A second transistor 528 has a first terminal coupled to a second reference source such as ground, a second terminal coupled to electroluminescent lamp 531 through node 532, and a control terminal coupled to driver 525. A third transistor 529 has a first terminal coupled to a first reference source (e.g., output voltage 560), a second terminal coupled to a second terminal of electroluminescent lamp 531 through node 533, and a control terminal coupled to driver 526. A fourth transistor 530 has a first terminal coupled to a second reference source (e.g., ground), a second terminal coupled to electroluminescent lamp 531 through node 533, and a control terminal coupled to driver 526. When driven by half-wave rectified signals as described above, the four transistors provide the signals to drive lamp 531.

Figure 6:
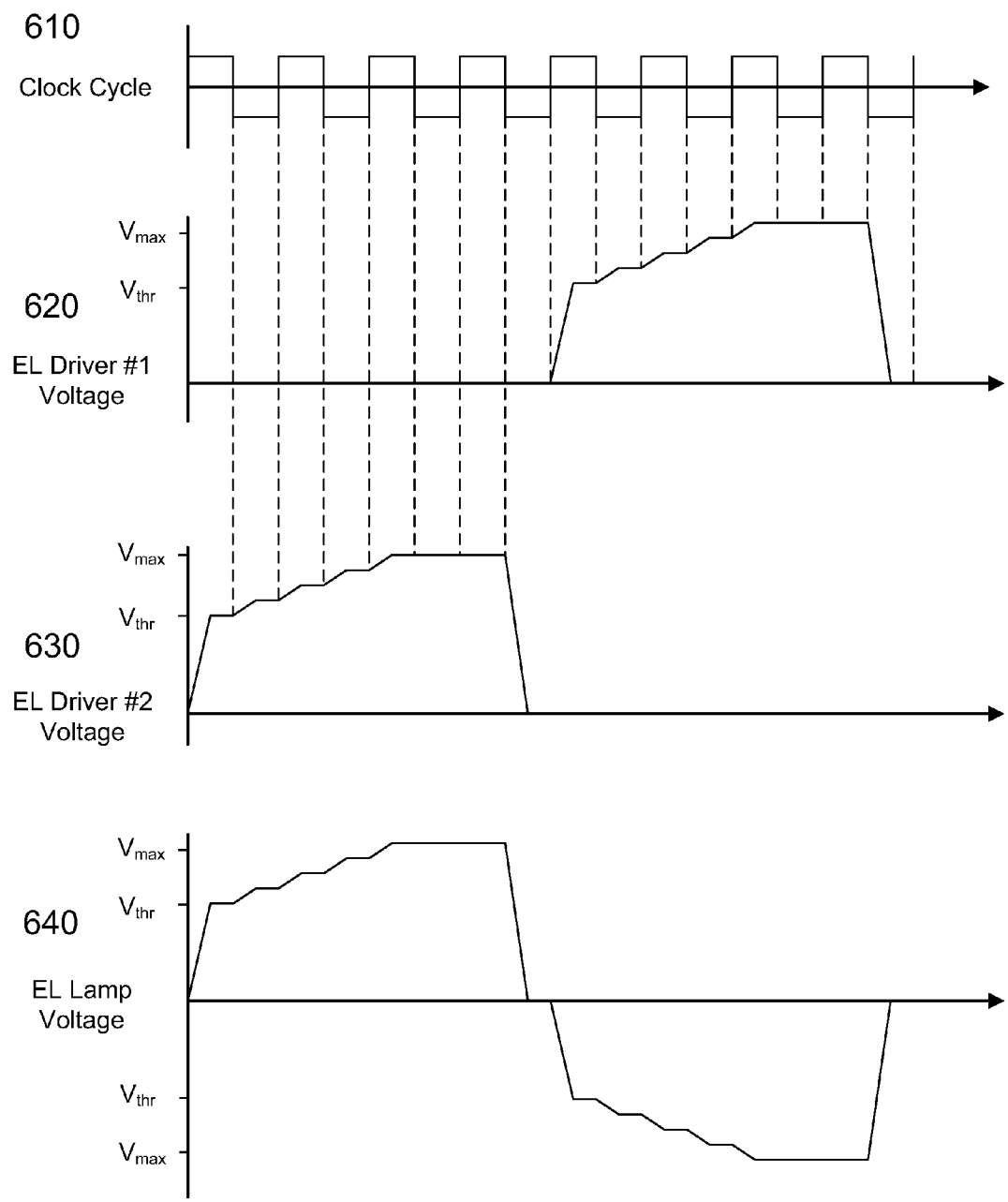
FIG. 6 is an example of a method of driving an electroluminescent lamp according to one embodiment of the present invention.

FIG. 6 is an example of a method of driving an electroluminescent lamp according to one embodiment of the present invention. Plot 610 illustrates the clock cycle at node 580 in FIG. 5. Plot 620 illustrates the signal at node 532 in FIG. 5. Similarly, plot 630 illustrates the signal at node 533 in FIG. 5. Plot 640 illustrates the signal received by electroluminescent lamp 531 from nodes 532 and 533 in FIG. 5. During the first clock cycle, the feedback circuit is programmed to set the output voltage on the lamp to Vthr. Accordingly, the lamp voltage increases to Vthr during this time period. On the next clock cycle, the feedback circuit is reprogrammed to increase the output voltage incrementally to the maximum output voltage, Vmax. The feedback circuit may be reprogrammed on each clock cycle to increase the voltage on the lamp from Vthr to Vmax in as many increments as desired. Accordingly, different clocks speeds and divider configurations could be used. The voltage increments may be, but necessarily are, equal. Different voltage increments or clock speeds could be used to implement a variety of waveshaping algorithms. A variety of different voltage increments could be used depending on the number of outputs available from the programmable feedback circuit. On the second half-cycle, the output is coupled to the second terminal of the lamp and the process is repeated.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, signals and methods of driving an electroluminescent lamp according to the present invention may include some or all of the innovative features described above. Based on the above disclosure and the following claims, other arrangements, embodiments, implementations and equivalents will be evident to those skilled in the art and may be employed without departing from the spirit and scope of the invention as defined by the claims.

What is claimed is:

1. An electronic circuit comprising:
an electroluminescent lamp having a first terminal and a second terminal;
a regulator having a first input coupled to an input voltage, an output for providing an output voltage, and a feedback input;
a programmable feedback circuit having a first input coupled to the output of the regulator, an output coupled to the feedback input of the regulator to provide a feedback voltage, and a control input for programming a relationship between the regulator output voltage and the feedback voltage; and
a driver circuit having a first control input, a first output coupled to the first terminal of the lamp, and a second output coupled to the second terminal of the lamp,
wherein during a first time period, the feedback circuit is programmed to increase a voltage across said electroluminescent lamp to a first threshold and then hold the voltage across said electroluminescent lamp constant,
wherein during one or more successive time periods, the feedback circuit is reprogrammed to successively increase the voltage across said electroluminescent lamp and then hold the voltage across said electroluminescent lamp constant, and wherein during a final time period, the feedback circuit is reprogrammed to increase a voltage across said electroluminescent lamp to a maximum voltage and then hold the voltage across said electroluminescent lamp constant.

2. The electronic driver of claim 1 wherein the regulator is a switching regulator.

3. The electronic driver of claim 2 wherein the regulator is a boost regulator.

4. The electronic driver of claim 1 wherein the programmable feedback circuit comprises a programmable resistor divider.

5. The electronic driver of claim 1 wherein the driver circuit is an H-Bridge driver.

6. The electronic driver of claim 1 further comprising:
a clock for generating a clock signal;
a first divider coupled to the clock, wherein the first divider divides the clock signal by a first value to produce a first divided clock signal;
a state machine coupled between the first divided clock signal and the programmable feedback circuit, the state machine reprogramming the programmable feedback circuit in response to receiving the first divided clock signal; and
a second divider coupled to receive the first divided clock signal, wherein the second divider divides the first divided clock signal by a second value to produce a second divided clock signal,
wherein the driver circuit alternately couples first and second terminals of said electroluminescent lamp to the output of the switching regulator using the second divided clock signal.

7. A method of driving an electroluminescent lamp comprising:

during a first time period, increasing a voltage across said electroluminescent lamp to a first threshold and then holding the voltage across said electroluminescent lamp constant;

during one or more successive time periods, successively increasing the voltage across said electroluminescent lamp and then holding the voltage across said electroluminescent lamp constant; and during a final time period, increasing a voltage across said electroluminescent lamp to a maximum voltage and then holding the voltage across said electroluminescent lamp constant.

8. The method of claim 7 further comprising reprogramming the feedback of a regulator coupled to the lamp.

9. The method of claim 7 further comprising reprogramming the feedback of a regulator coupled to the lamp at first frequency and alternating the voltage across said electroluminescent lamp at a second frequency, wherein the second frequency is a multiple of the first frequency.

10. The method of claim 7 further comprising generating the voltage across the electroluminescent lamp using a switching regulator.

11. The method of claim 10 further comprising coupling the input of the switching regulator to a battery, wherein the switching regulator is a boost regulator.

12. The method of claim 7 further comprising:
generating a first clock signal at a first frequency;
dividing the clock signal by a first value to produce a first divided clock signal;
reprogramming a programmable resistor divider coupled between an output of a switching regulator and a feedback input of the switching regulator using the first divided clock signal;
dividing the first divided clock signal by a second value to produce a second divided clock signal; and
alternately coupling first and second terminals of said electroluminescent lamp to the output of the switching regulator using the second divided clock signal.

* * * * *